Patented May 31, 1932

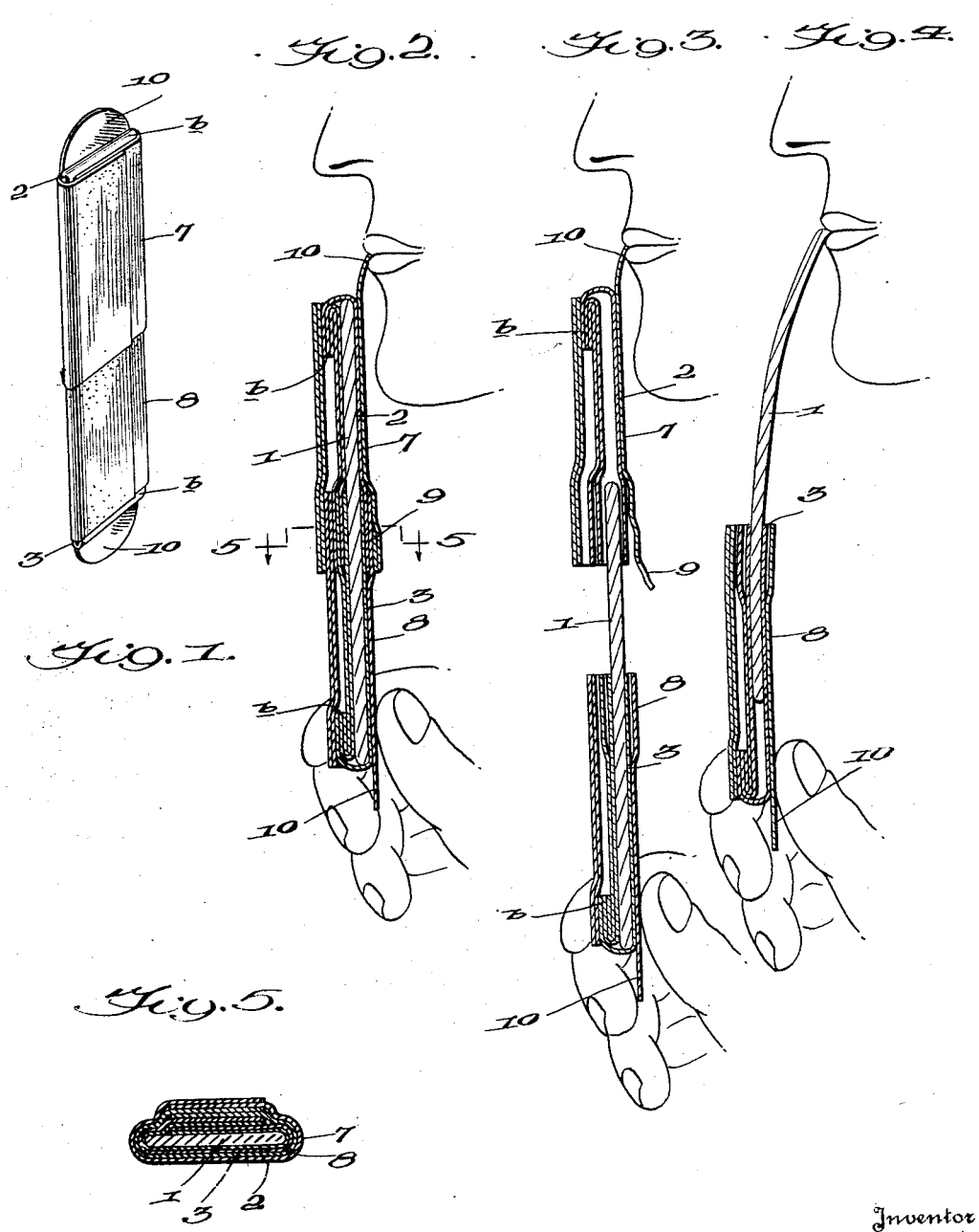

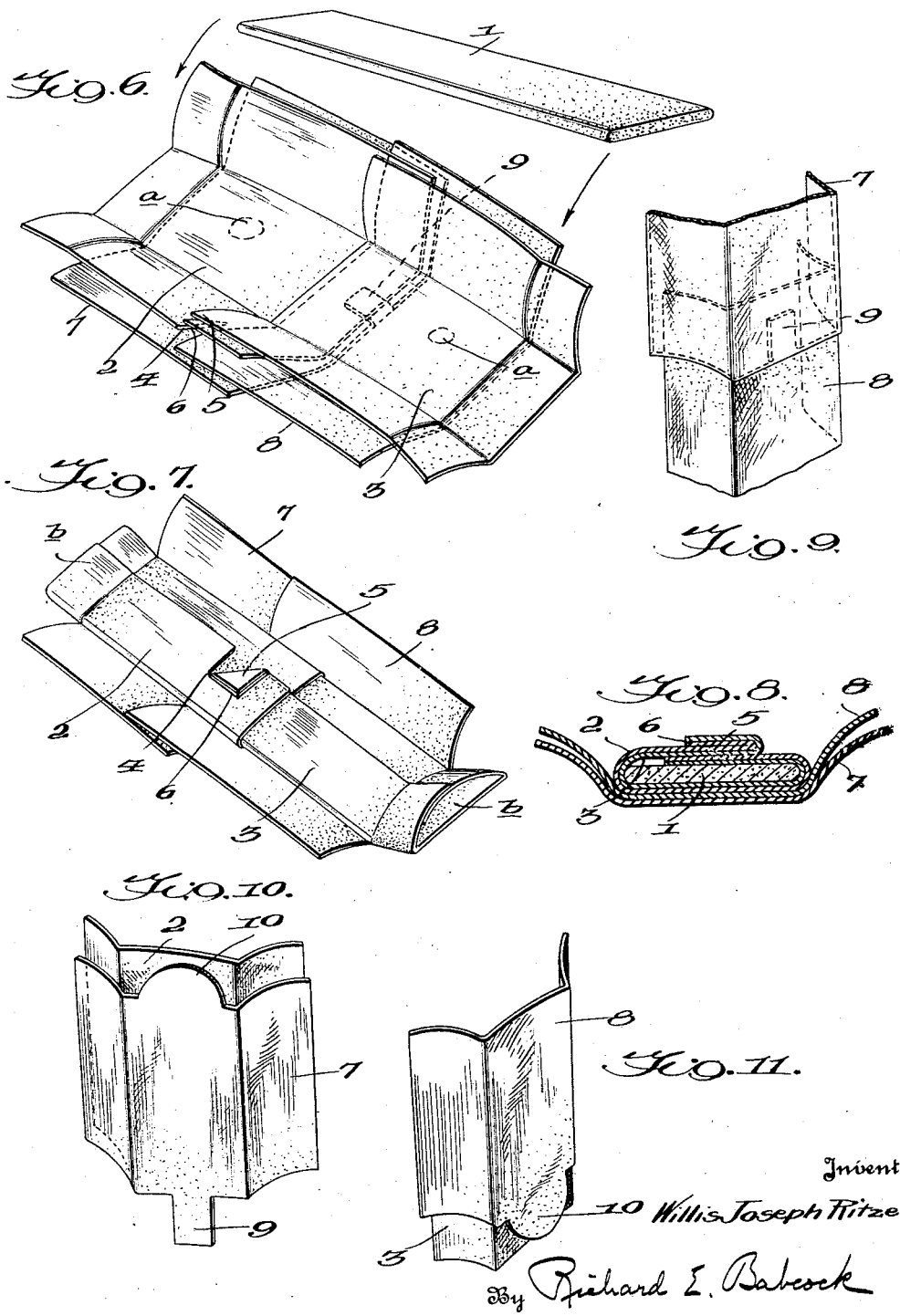

1,861,285

UNITED STATES PATENT OFFICE

WILLIS JOSEPH RITZEL, OF PASADENA, CALIFORNIA

ELONGATED TABLET PACKAGE AND WRAPPING

Application filed April 3, 1931. Serial No. 527,526.

This invention relates to packages or special wrapping means for sticks of chewing gum and like relatively thin, long, narrow tablet or sheet form articles which are practically universally now sold commercially in packages of a number of individual wrapped units held together by a common wrapper or long tubular form band, or which may be sold by the individual sticks as may be desired.

My invention is particularly intended for use for persons when driving automobiles, boats, aeroplanes, or while otherwise engaged in some activity requiring the use of at least one hand in operating or steering some mechanism.

Due to the fact that chewing gum especially is very carefully wrapped to seal the individual units or sticks to protect them against normal atmospheric conditions until such time as they may be consumed or used up, it is quite difficult for anyone to strip off such wrappings and place the gum in his mouth without using both hands, so much so that, where there is no one to do it for them most motorists either do without the satisfatcion of their desire for a chew of gum while driving or else bring their cars to a stop so that they can safely have the free use of both hands in stripping the wrappings from the desired gum.

The objects of my present invention are, to provide a special wrapping means or package whereby the usual inner and outer wrappings may be simultaneously partially stripped from the individual unit of gum so that the latter may be easily gripped between the lips or teeth and the stripping operation thereafter completed, and this simply with the use of one hand and the lips or teeth and without involving the annoyance of having to stop or the risk of even momentarily leaving the car to steer itself while the motorist uses both hands to strip the gum; to provide a perfect sanitary package such that the contained chewing gum may be introduced directly into the consumer's mouth without need for, or risk of, the actual gum, as distinguished from its covering, being touched by the consumer's hand or clothing or any foreign object, whereby said gum is completely protected against contamination with, or exposure to, germs or serving as a germ carrier; to provide in such a package a wrapping comprising a plurality of attached or connected pairs of wrapping sections, the individual sections of which are adapted to overlap in a longitudinal direction with the corresponding sections of each other whereby the stripping operation is clearly simplified and facilitated; to provide special yielding, frictional, or tearing means for normally yieldably connecting the respective adjacent overlapping end portions of the respective corresponding sections of the respective pairs of wrapping sections together to normally hold them against relative endwise movement, while permitting the connecting means to be easily destroyed and one pair of sections to be pulled by a single movement from one end of the gum, leaving said gum exposed to be gripped between the lips or teeth, while the other pair of wrapping sections together with the portion of the gum covered thereby is gripped and held between the thumb and forefinger of the consumer; to provide in such a combined sectional wrapping unit a construction providing for the sealing of the contained gum at all points; to provide simple, economical, strong and easily gripped pull tabs on the distant end portions of the outer wrapping sections of the respective pairs of wrapping sections which will be prominently presented beyond the ends of the unit or package and easily grasped between the lips or teeth; to provide a special leverage construction for facilitating the tearing of the connection between the two overlapping outer wrapping sections whereby pulling against the tensile strength of the paper will be avoided; to provide a wrapper which is equally easy to operate from either end so that it will make no difference which end portion is grasped in the hand and which end is grasped between the teeth or lips; to provide a package comprising an all paper wrapping, and to provide a wrapping particularly lending itself to manufacture and application to the goods by automatically cutting, wrapping, folding and gluing machinery of the type such as is now in extensive use for wrapping and packaging goods of this general character.

While the field of use particularly in view is in connection with long, narrow, thin tablets, sticks or sheets of chewing gum such as now extensively sold in this country, the invention is not limited to use with chewing gum but may be applied to any similarly shaped articles where desired.

In this application I show and describe only the preferred embodiment of my invention simply by way of illustration of the practice thereof, as by law required; however, it is obvious that my invention is capable of a number of other and different embodiments and that the various details thereof may be modified in a number of different ways, all without departing from my said invention and, therefore, the drawings and description herein are to be considered as merely illustrative and not as exclusive.

In the accompanying drawings:

Figure 1 represents a perspective view of a commercial package unit embodying my invention, said unit to be sold either separately or to be wrapped together with a number of other units in a larger commercial package;

Figure 2, a central longitudinal section through one of said units on a greatly enlarged scale, gripped preparatory to initial partial stripping;

Figure 3, a view similar to Figure 2, showing the upper pair of wrapping sections totally disconnected from the lower pair and being removed from the upper end portion of the gum;

Figure 4, a view similar to Figure 3, after the upper pair of sections has been discarded and the gum itself has been gripped by the teeth or lips, the grip on the lower sections being relaxed so as to simply hold the lower sections while the gum is being pulled therefrom;

Figure 5, a cross section on the line 5—5 of Figure 2, looking in the direction of the arrows;

Figure 6, a perspective superposed view of the gum 1 and the composite wrapper in open condition;

Figure 7, a perspective view of the package in an intermediate stage, the inner wrapping sections having been folded over upon each other and their interleaved locking portions or corners having been folded back;

Figure 8, a cross sectional view taken on a line intersecting the interlocking corners or portions 5 and 6, with the wrapping sections in the condition shown in Figure 7;

Figure 9, a fragmentary detail perspective view of the medial overlapping portions of the outer wrapping sections 7 and 8;

Figure 10, a perspective detail view of the pair of wrapping sections 2 and 7; and Figure 11, a detail perspective view of the pair of wrapping sections 3 and 8.

Referring now in detail to the drawings, the commercial package as sold over the counter may consist of simply a single unit as illustrated in Figure 1 or may comprise a plurality of individual units, say five or six, held together by a common outer wrapper or binder (not shown) such as is well known in the art and has long been in commercial use.

Each individual unit consists of a stick of gum 1, two pair of overlapping interleaved connected wrapping sections 2 and 7 and 3 and 8 respectively, the sections of each pair being connected together by any suitable means preferably an adhesive such as illustrated at $a$ in Figure 6, so as not to have any independent total movement independent of each other, or so as to be incapable of endwise movement with relation to each other.

The respective pairs of wrapping sections 2 and 7 and 3 and 8 will have their adjacent end portions in lapping relation, the inner end of section 2 lying between or being interleaved between the adjacent end portions of sections 3 and 8, and the adjacent end of section 7 lying against the outer face of section 8. The section 2 will have a cut or notch 4 extending inward from one side edge at a point in registry with the adjacent end edge of the adjacent portion of the section 3, so that the corner portions 5 and 6 of the sections 3 and 2 respectively may be folded back upon each other in a triangular form, as well shown in Figures 7 and 8, to form a definite frictional interlock between these two inner wrapping sections 2 and 3, said sections being held in tight engagement with each other by the encircling outer wrapping sections 7 and 8 in the finished wrapped unit, as illustrated in Figure 2 and Figure 1.

The outer wrapping section 7 is preferably formed, as illustrated in Figure 10, with a connecting tab 9, the outer face of which, in the position illustrated in Figure 10, is coated with a suitable adhesive. This tab 9 should be folded back against the inner face of the wrapping section 7 and applied against the opposed outer face of the interleaved end portion of the outer wrapping section 8 while the adhesive is in a moist or adhesive condition. With the sections 7 and 8 thus connected, it will readily be appreciated that when said sections are relatively pulled in opposite directions, the pull on the tab 9 will not be in a straight line edgewise of the paper or of the direction of the fibers of the paper but on the contrary there will be an unrolling action or a pulling at an angle which will greatly facilitate the tearing operation and will avoid all risk of difficulty due to the possibility of a fault in the paper resulting in unexpected tensile strength in the connecting paper portion, in as much as the tearing may occur either in the tab 9 lengthwise thereof, or crosswise thereof adjacent the end of the main body portion of section 7, or the end portion of section 8 may tear out, depending on which yields the most readily.

With the pair of sections 2 and 7 connected together by adhesive $a$ as mentioned, and the pair of sections 3 and 8 connected together by adhesive $a$ and the two pairs of sections connected together by a yielding connection, preferably by an adhesive coated tab 9 such as above illustrated and described in the drawings, and with the adjacent end portions of the pairs of sections wrapped and interleaved as above described and as well illustrated in the drawings, gum 1 will be disposed on the central portion of the composite inner wrapper comprising the sections 2 and 3 and the side portions of these wrappers will be folded over into overlapping relation and the interlocking corner portions 5 and 6 of the respective inner wrapping sections 3 and 2 will be folded back into condition, all as illustrated in Figure 7. The next step is to fold over the end portions $b$ of the respective inner wrapping sections 2 and 3 to lie flat against the adjacent outer faces of the respective wrapping sections and so as to be overlapped by the outer wrapping sections 7 and 8 respectively. Next, the edge portions of the outer wrapping sections 7 and 8 will be brought into overlapping relation. Said sections 7 and 8 will be drawn tightly about the package or enclosed inner wrapping sections and enclosed gum as usual and the lapped edge portions of the section 7 will be secured together by any suitable means such as a suitable adhesive as usual, and similarly the lapped edge portions of the section 8 will be secured together by a suitable means or adhesive.

In use, when the consumer desires to strip the gum, it is simply necessary for him to take one of the units, grasp one end thereof between the thumb and forefinger of one hand and press thereon so as to grip the gum through the wrapping (without penetrating the wrapping) while seizing the end pull tab 10 of the other end of the unit between his teeth or lips, and then exerting a pull endwise of the unit. Such pull results in destroying the connection at 9 between the outer sections 7 and 8 and in unfolding the interlocking connection at 4 and 5 between the inner sections 2 and 3, so that the pair of sections 2 and 7, or 3 and 8, as the case may be, is pulled free from the upper end portion of the gum 1, which upper end portion is left exposed for approximately half its length and is presented toward the consumer's mouth. The consumer next inserts the exposed upper end portion of the gum in his mouth and grasps it with his lips or teeth and then, relaxing his hold on the remaining unstripped wrapping sections 3 and 8 or 2 and 7 as the case may be to release the gum and yet retain his grip on the said retained wrapping sections, pulls downward on said retained wrapping sections to strip them from the lower end of the gum and then casts said retained sections aside, all as clearly illustrated in Figures 2, 3 and 4.

From the stripping operation as above described and as clearly illustrated in said Figures 2, 3 and 4, it is most manifest that the unit may be grasped at either end in the consumer's hand, that there is no need for any special study of the package before attempting stripping thereof, that the package particularly lends itself to the most obvious stripping actions, that in all instances the exposed portion of the gum will always be presented between the consumer's mouth and the portion of the wrapper gripped by the consumer's hand about the lower portion of the gum stick, and that the most logical thing for the consumer to do is to insert the exposed portion of the gum in his mouth and hold it while he strips off the remaining portion of the wrapping. Therefore, there is not only no occasion for the consumer to ever touch the stick of gum with his hand or with any foreign object, but as a matter of fact, the most natural and obvious thing for the consumer to do, and flowing as directly incidental to the construction and arrangement of the wrapping, is for him to grasp the gum and insert it in his mouth during the stripping operation, all without touching it.

While it is preferred that the lapped end portions of the sections 2 and 3 should be provided with interlocking means, such as leaves 5 and 6 adapted to yield to a pull exerted endwise, this is not essential to my invention considered in its broader aspects and may be omitted.

If such yielding interlocking means is provided, the construction illustrated and described is preferred but any suitable means functioning to the same end may be employed, and while it is preferred that such means should be integral with the respective sections 2 and 3, this also is not essential.

While it is preferred that adhesive such as indicated at $a$ should be employed to secure the sections 2 and 7 and the sections 3 and 8 together to function in the manner stated, this is merely preferred as a simple and easy means of interconnection and any practical suitable means of interconnection, whether it be adhesive or otherwise, which means of connection is capable of functioning to the same end, may be employed.

While the folded back construction of the connecting tab 9 for connecting sections 7 and 8 is preferred, this is not an essential feature of my invention considered in its broader aspects and any means of connection functioning to yield to a normal or usual endwise pull may be employed.

Having thus described my invention, what I claim as new and desire to secure by Letters Patent is:

1. A wrapping for a tablet of long, narrow, thin contour, said wrapping comprising two pairs of wrapping sections, each said pair comprising an inner wrapping section and an outer wrapping section, means for securing the sections of each said pair together against relative endwise movement, said pairs of sections being adapted to be disposed about the respective end portions of the tablet and in assembled relation having their adjacent end portions in interleaved lapping relation, and said inner wrapping sections adapted to be folded longitudinally about the enclosed tablet and to have their folded end portions folded transversely so as to lie flat against their adjacent side faces and being formed with portions adapted to be folded back upon one of said inner sections to form a frictional interlocking engagement between the adjacent end portions of said inner sections to resist endwise separation, in combination with a connecting tab integral with the inner end portion of one of said outer sections and adapted to be folded back against the inner face of said section, adhesive applied to the inner face of the tab as thus folded and serving to secure the same to the opposed face of the inlapped end portion of the other outer wrapping section, and adhesive applied to the inner face of one of the marginal side edge portions of each said outer wrapping section and serving to secure the marginal edge portions of the respective outer wrapping sections together after the same has been drawn tightly about the inner wrapping sections and contained tablet, said outer sections being formed with projecting pull tabs extending beyond the respective ends of the rest of the package and said outer sections as applied about the inner wrapping sections extending across and sealing the respective end portions thereof and one of said outer wrapping sections extending across the folded interlocking portions of said inner sections to hold them in flat folded yielding interlocking engagement.

2. A wrapping for a tablet of long, narrow, thin contour, said wrapping comprising two pairs of wrapping sections, each said pair comprising an inner wrapping section and an outer wrapping section, means for securing the sections of each said pair together against relative endwise movement, said pairs of sections being adapted to be disposed about the respective end portions of the tablet and in assembled relation having their adjacent end portions in interleaved lapping relation, and said inner wrapping sections adapted to be folded longitudinally about the enclosed tablet and to have their end portions folded transversely so as to lie flat against their adjacent side faces, in combination with a connecting tab integral with the inner end portion of one of said outer sections and adapted to be folded back against the inner face of said section, adhesive applied to the inner face of the tab as thus folded and serving to secure the same to the opposed face of the inlapped end portion of the other outer wrapping section, and adhesive applied to the inner face of one of the marginal side edge portions of each said outer wrapping section and serving to secure the marginal edge portions of the respective outer wrapping sections together after the same has been drawn tightly about the inner wrapping sections and contained tablet, said outer sections being formed with projecting pull tabs extending beyond the respective ends of the rest of the package and said outer sections as applied about the inner wrapping sections extending across and sealing the respective end portions thereof.

3. A wrapping for a tablet of long, narrow, thin contour, said wrapping comprising two pairs of wrapping sections, each said pair comprising an inner wrapping section and an outer wrapping section, means for securing the sections of each said pair together against relative endwise movement, said pairs of sections being adapted to be disposed about the respective end portions of the tablet and in assembled relation having their adjacent end portions in interleaved lapping relation, and said inner wrapping sections adapted to be folded about the enclosed tablet and being formed with portions adapted to form a frictional interlocking engagement between the adjacent end portions of said inner sections to resist endwise separation, in combination with a connecting tab integral with the inner end portion of one of said outer sections and adapted to be folded back against the inner face of said section, adhesive applied to the inner face of the tab as thus folded and serving to secure the same to the opposed face of the in-lapped end portion of the other outer wrapping section, and adhesive applied to the inner face of one of the marginal side edge portions of each said outer wrapping section and serving to secure the marginal edge portions of the respective outer wrapping sections together after the same has been drawn tightly about the inner wrapping sections and contained tablet, said outer sections being formed with projecting pull tabs extending beyond the respective ends of the rest of the package.

4. A wrapping for a tablet of long, narrow, thin contour, said wrapping comprising two pairs of wrapping sections, each said pair comprising an inner wrapping section and an outer wrapping section, said sections of each said pair being connected together against relative endwise movement, said pairs of sections being adapted to be disposed about the respective end portions of the tablet and in assembled relation having their adjacent end portions in interleaved lapping relation, and said inner wrapping sections adapted to be folded about the enclosed tablet, in combination with a connecting tab integral with the inner end portion of one of said outer sections and adapted to be folded back against the inner face of said section, adhesive applied to the inner face of the tab as thus folded and serving to secure the same to the opposed face of the in-lapped end portion of the other outer wrapping section, and means to secure the marginal edge portions of the respective outer wrapping sections together after the same has been drawn tightly about the inner wrapping sections and contained tablet, said outer sections being formed with projecting pull tabs.

5. A wrapping for a tablet of long, narrow, thin contour, said wrapping comprising two pairs of wrapping sections, each said pair comprising an inner wrapping section and an outer wrapping section, said sections of each said pair being connected together against relative endwise movement, said pairs of sections being adapted to be disposed about the respective end portions of the tablet and in assembled relation having their adjacent end portions in interleaved lapping relation, and said inner wrapping sections adapted to be folded about the enclosed tablet, in combination with a connecting tab connected to one of said outer sections, means serving to secure said tab to the other outer wrapping section, and means to secure the marginal edge portions of the respective outer wrapping sections together after the same has been drawn tightly about the inner wrapping sections and contained tablet.

6. A wrapping for a tablet of long, narrow, thin contour, said wrapping comprising two pairs of wrapping sections, each said pair comprising an inner wrapping section and an outer wrapping section, said sections of each said pair being connected together against relative endwise movement, said pairs of sections being adapted to be disposed about the respective end portions of the tablet and in assembled relation having their adjacent end portions in interleaved lapping relation, and said inner wrapping sections adapted to be folded about the enclosed tablet, in combination with yielding means adapted to connect the adjacent portions of said outer sections, means serving to secure the marginal edge portions of the respective outer wrapping sections together after the same has been drawn tightly about the inner wrapping sections and contained tablet, and projecting pull tabs connected to the respective pairs of wrapping sections.

7. A wrapping for a tablet of long, narrow, thin contour, said wrapping comprising two pairs of wrapping sections, each said pair comprising an inner wrapping section and an outer wrapping section, said sections of each said pair being connected together against relative endwise movement, said pairs of sections being adapted to be disposed about the respective end portions of the tablet and in assembled relation having their adjacent end portions in interleaved lapping relation, and said inner wrapping sections adapted to be folded about the enclosed tablet, in combination with yielding means adapted to connect the adjacent portions of said outer sections, and means to secure the marginal edge portions of the respective outer wrapping sections together after the same has been drawn tightly about the inner wrapping sections and contained tablet.

In testimony whereof, I have signed my name to this specification at Pasadena, California, this 28th day of March, 1931.

WILLIS JOSEPH RITZEL.